US010217038B2

(12) United States Patent
Syed

(10) Patent No.: US 10,217,038 B2
(45) Date of Patent: *Feb. 26, 2019

(54) SUSPENDING AND RESUMING TRANSACTIONS THROUGH WIRELESS BEACON COMMUNICATIONS

(71) Applicant: PAYPAL, INC., San Jose, CA (US)

(72) Inventor: Mobeen Syed, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,556

(22) Filed: Feb. 9, 2018

(65) Prior Publication Data

US 2018/0247168 A1    Aug. 30, 2018

Related U.S. Application Data

(63) Continuation of application No. 15/697,922, filed on Sep. 7, 2017, now Pat. No. 9,892,354, which is a continuation of application No. 15/584,765, filed on May 2, 2017, now Pat. No. 9,811,772, which is a continuation of application No. 15/194,244, filed on Jun. 27, 2016, now Pat. No. 9,639,834, which is a continuation of application No. 14/466,916, filed on Aug. 22, 2014, now Pat. No. 9,378,494.

(51) Int. Cl.
| | |
|---|---|
| G06K 19/06 | (2006.01) |
| G06Q 20/32 | (2012.01) |
| H04W 4/02 | (2018.01) |
| G06Q 20/20 | (2012.01) |
| G06K 7/14 | (2006.01) |
| H04W 76/11 | (2018.01) |

(52) U.S. Cl.
CPC ..... *G06K 19/06009* (2013.01); *G06K 7/1404* (2013.01); *G06Q 20/20* (2013.01); *G06Q 20/325* (2013.01); *G06Q 20/3224* (2013.01); *H04W 4/02* (2013.01); *H04W 76/11* (2018.02)

(58) Field of Classification Search
CPC .............................................. G06K 19/06009
USPC ..... 235/487, 378, 472.02, 380, 382; 705/20, 705/39, 65
See application file for complete search history.

(56) References Cited

U.S. PATENT DOCUMENTS

| | | |
|---|---|---|
| 6,386,448 B1 | 5/2002 | Addy |
| 6,535,880 B1 | 3/2003 | Musgrove et al. |
| 2003/0232298 A1 | 12/2003 | Neufeldt |
| 2014/0214466 A1 | 7/2014 | Francis |

(Continued)

*Primary Examiner* — Allyson Trail
(74) *Attorney, Agent, or Firm* — Haynes and Boone, LLP

(57) ABSTRACT

There are provided systems and methods for suspending and resuming transactions through wireless beacon communications. A merchant may set up a wireless beacon with employee devices. The beacons may connect to a user's device and assist the employee with determining and suspending a transaction for the user. Based on the connections between the user's device and a wireless beacon attached to an employee device, the employee device may receive an identifier for the user. The identifier may also be received from a previous check-in by the user. The employee or a user may scan one or more items that the user may wish to purchase. A transaction may be generated using the scan and may be associated with the user's identifier. Later the transaction may be recalled using the user's identifier or a transaction code identifying the transaction. Payment information for the user may also be associated with the transaction.

20 Claims, 5 Drawing Sheets

(56) References Cited

U.S. PATENT DOCUMENTS

| | | |
|---|---|---|
| 2014/0289823 A1 | 9/2014 | Tobin |
| 2015/0120475 A1 | 4/2015 | Pedley et al. |
| 2015/0186874 A1 | 7/2015 | Govindarajan et al. |
| 2015/0199672 A1 | 7/2015 | Woloshin |
| 2015/0220971 A1 | 8/2015 | Raj et al. |

SUSPENDING AND RESUMING TRANSACTIONS THROUGH WIRELESS BEACON COMMUNICATIONS

CROSS REFERENCE TO RELATED APPLICATIONS

This application is a continuation of U.S. patent application Ser. No. 15/697,922, filed Sep. 7, 2017, which is a continuation of U.S. patent application Ser. No. 15/584,765, filed May 2, 2017 (now issued as U.S. Pat. No. 9,811,772 on Nov. 7, 2017), which is a continuation of U.S. patent application Ser. No. 15/194,244, filed Jun. 27, 2016 (now issued as U.S. Pat. No. 9,639,834 on May 2, 2017), which is a continuation of U.S. patent application Ser. No. 14/466,916, filed Aug. 22, 2014 (now issued as U.S. Pat. No. 9,378,494 on Jun. 28, 2016), the contents of which are incorporated by reference in their entireties.

TECHNICAL FIELD

The present application generally relates to suspending and resuming transactions through wireless beacon communications and more specifically to utilizing wireless beacons to receive user information that is then associated with one or more scanned items the user wishes to purchase.

BACKGROUND

A user may visit a merchant location to select items or services that the user wishes to purchase. For certain purchases, this may require the user to begin a transaction but not complete the transaction until a later time period. For example, the user may request copies to be made of a book, and may then have to later return to the copier to receive the copies and pay for the transaction. For other purchases, the user may select items for purchase but wish to continue shopping after selecting the items. A user may be shopping for large electronics or may wish to scan items in for a transaction and continue shopping if lines are significantly long. Moreover, at other times it may be useful for the user to suspend the transaction when the merchant is required to later complete the sale of the selected items or services. Thus, the transaction is left open and needs to be resumed at a later time period. However, without collecting some user information and/or providing the user with identification for the transaction, the user may not be able to later recall the transaction. Additionally, collection of user information may be difficult and time consuming, and users may opt to forego providing such information, which may lead to poor customer experiences.

Figure 1:
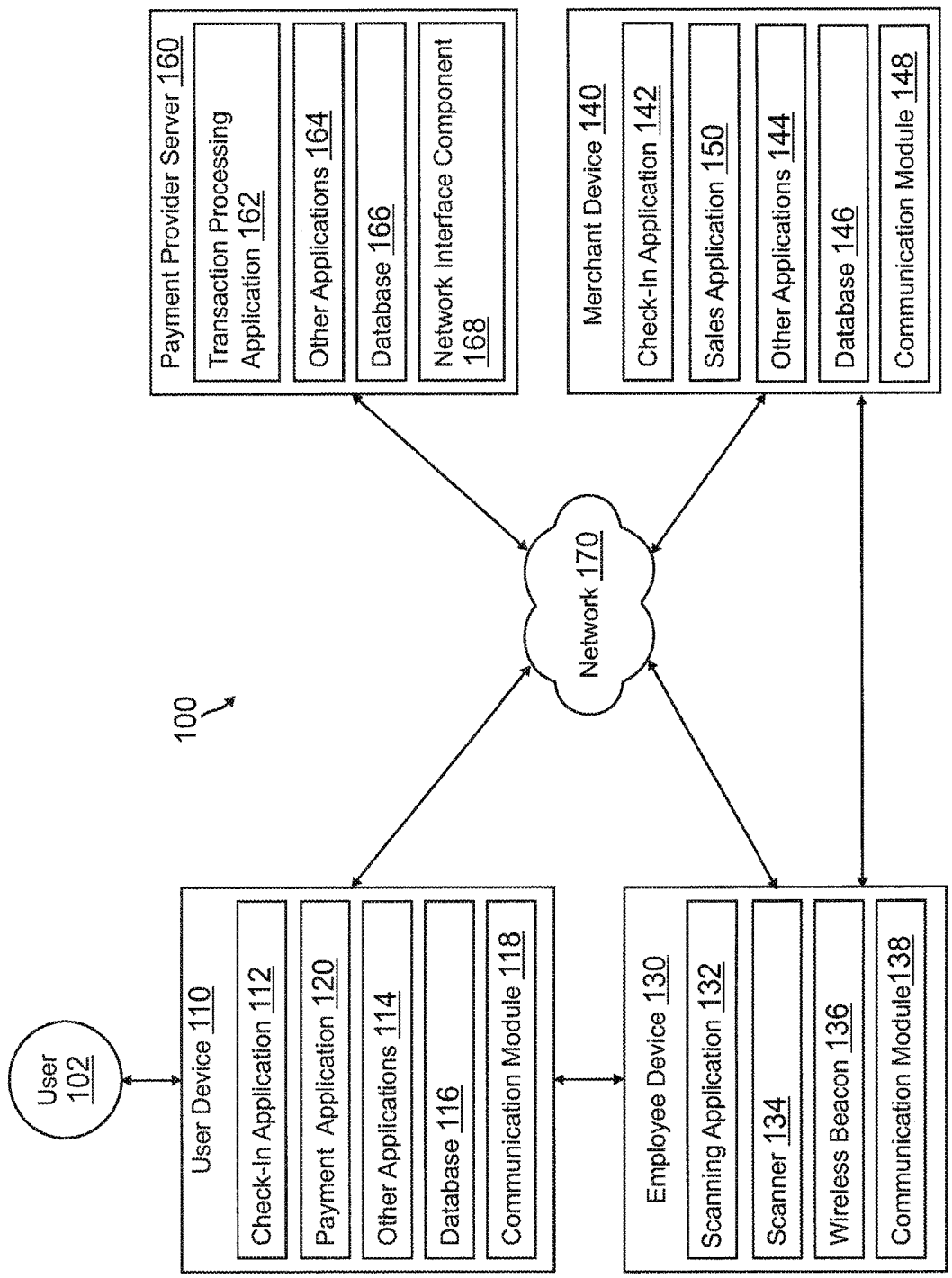
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for suspending and resuming transactions through wireless beacon communications. Systems suitable for practicing methods of the present disclosure are also provided.

Various locations may provide short range wireless communications with a user device, such as through wireless beacons using one or more of Bluetooth Low Energy (BLE) communication protocol, LTE Direct communication protocol, WiFi communication protocol, etc. These beacons may be set up at a location and communicate with user devices to alert users of check-in services through their device. The beacons may provide additional functionality, such as establishing a connection with the user devices to establish, suspend, and/or resume transactions. The beacons may communicate with the devices directly, including information stored in the beacons. The beacons may also enable communication between the user device and a device attached to, or in communication with, the beacon, such as a device of a merchant and/or the merchant's employee.

A merchant may offer suspension and resumption of transactions using the aforementioned wireless beacons at a merchant location. A merchant location may correspond to a retail store, a shopping market, a mall location, or other physical location where a user, such as a consumer or purchaser, may visit to purchase items. However, in other embodiments, the location employing wireless beacons as discussed below may correspond to a location having a line where the wireless beacons may collect initial information for a user and later recall the information. The merchant location may utilize short range wireless beacons at the merchant location to communicate with a user device that the user possesses. For example, the short range wireless beacons may be established throughout the merchant location in order to effect a check-in and/or reception of user information when the user is at the location. The beacons may employ BLE, LTE Direct, WiFi, or other communications that emit a signal receivable by the user's device. The communication may include an identifier for the beacon, the user, the merchant, and/or a payment provider that provides payment services between the user and the merchant.

A user may set up a user device to passively monitor for BLE, LTE Direct, WiFi, or other communication signals from the beacon. When the user device detects the signal and verifies the one or more identifiers, both the user device and the beacon may ramp up in power and establish a connection, where the connection may further enable the user device to communicate with the merchant and/or an employee through a device in possession of the merchant/employee. The user device may provide some check-in information, identifier, or other identification information (e.g., payment information) to the merchant/employee, which may later be used to identify a transaction. The beacon may be connected to a networked device at the merchant location, or the beacon may include network functionality to communicate with other devices and/or servers. Thus, the beacon enables the user device to establish a connection, communicate check-in information (e.g., an identifier for the user), and/or initiate a check-in with the merchant. The check-in may be completed automatically when the user device is in range of the beacon, or may be completed after prompting the user to check-in when the user device is in range of the beacon.

As previously discussed, once a connection is first established with the user device and the beacon, check-in information and/or other information may be received. The user may then bring selected items or services to an employee to scan the items/services in for a transaction. In other embodiments, the user may perform the scanning themselves, such as through the user device or a scanner provided with a shopping cart/basket. Once the items/services have been scanned and entered, a transaction for the items/services may be generated with the merchant. The transaction and transaction information may be stored with the identification information received from the previous connection. The identification information may be retrieved for storage with the transaction using a second connection between a wireless beacon corresponding to the scanner and the user device of the user. For example, when an employee of the merchant approaches the user and scans the user's items, an identifier may be recalled for the user and associated with the transaction generated for the items. The user may then choose to complete a transaction for the selected items/services, or may suspend the transaction for resuming, processing, and completing later.

If the user chooses to suspend the transaction, the transaction may be stored with the identifier for later recall. User information, payment information, and/or incentive information (e.g., loyalty accounts, discounts, etc.) may also be stored with the transaction and/or determined using the received identification information for the user. A transaction code may be provided to the user for resuming the transaction when the user is ready. In other embodiments, the transaction may later be resumed by the user using another connection between the user device and another wireless beacon located at, nearby, or connected to a point of sale (PoS) or checkout device. Once the transaction is resumed, the user may provide a payment instrument, such as a payment account with a payment provider, and a payment for the transaction may be processed. Incentives may be applied to the transaction prior to processing the payment. If the user has continued shopping after suspending the transaction, additional items/services the user wishes to purchase may be added to the transaction. The transaction may be suspended if a merchant employee is required to provide the items/services to the user (e.g., retrieve from a stockroom, remove security tags, provide items for a requested service, etc.). Thus, the transaction may be resumed when the user is ready to pick up their items/services in another line or area. Therefore, when the transaction is resumed and/or a payment is processed, the merchant may provide the purchased items/services to the user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, an employee device 130 having a scanner 134 and a wireless beacon 136, a merchant device 140, and payment provider server 160 in communication over a network 170. User 102, such as a consumer or other shopper at a merchant location, may arrive at the merchant location corresponding to employee device 130 and merchant device 140. The merchant location may offer one or more items/services for sale to user 102. User 102 may establish a check-in with the merchant location and may select one or more items/services to purchase. The items/services may be scanned by an employee at the merchant location using employee device 130. In other embodiments, employee device 130 may be provided with a cart or basket, which user 102 may utilize to scan and hold selected items/services for purchase. Once the items/services are scanned, a transaction may be generated and associated with user identification information (e.g., an identifier) provided during the check-in. User 102 may then suspend the transaction with merchant device 140. When user 102 is ready to resume the transaction, user 102 may utilize payment provider server 160 to provide payment for the transaction.

User device 110, employee device 130, scanner 134, wireless beacon 136, merchant device 140, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with employee device 130, wireless beacon 136, merchant device 140, and/or payment provider server 160. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a payment application 120, other applications 114, a database 116, and a communication module 118. Check-in application 112, payment application 120, and other applications 114 may correspond to processes, procedures, and/or applications, for example, a software program, executable by a hardware processor. In other embodiments, user device 110 may include additional or different software as required.

Check-in application 112 may be used by user 102 of user device 110 to complete a check-in for user 102 at a location corresponding to employee device 130/merchant device 140 and establish a connection with wireless beacon 136. Check-in application 112 may correspond to an application utilized by user device 110 with merchant device 140 to complete a check-in for the merchant location. The check-in with merchant device 140 may correspond to a process to log in to a user account of user 102 with merchant device 140 (or payment provider server 160 if payment provider server 160 provides check-in services). In other embodiments, the check-in may provide and/or verify the identity of user 102, including transmission of an identifier for user 102 and/or user device 110 or other identification information (e.g., personal information, payment/financial information, a loyalty account identifier, etc.). The check-in may be completed over network 170 with merchant device 140. In such embodiments, check-in application 112 may correspond more generally to a browser application configured to communicate with merchant device 140. In other embodiments, the check-in may be completed when user device 110 connects to a wireless beacon established at the merchant location. In such embodiments, check-in application may connect to the wireless beacon (including wireless beacon 136) as explained below in reference to the connection with wireless beacon 136, and the aforementioned identification information may be provided to wireless beacon 136 and merchant device 140.

Check-in application 112 may also cause user device 110 to connect to wireless beacon 136 to assist in suspending a transaction for items scanned in by scanner 134. In this regard, check-in application 112 may receive short range wireless communications from wireless beacon 136 at the merchant location and transmit information to wireless beacon 136. In various embodiments, the information transmitted to wireless beacon 136 and/or another wireless beacon may correspond to check-in information for a check-in process with merchant device 140 (or payment provider server 160 if payment provider server 160 provides check-in services). In such embodiments, the check-in information may include an identifier or other identification information for user 102 as previously discussed. The check-in information may be provided to wireless beacon 136 or another wireless beacon by check-in application 112 prior to scanning in items/service for a transaction by employee device 130. In other embodiments, the check-in information may be transmitted to wireless beacon 136 when employee device 130 is scanning in items/service for a transaction for user 102.

Once check-in information, an identifier, and/or other identification information is transmitted by check-in application 112, check-in application 112 may connect to wireless beacon 136 during scanning of items for a transaction. Wireless beacon 136 may be range limited to a small area around employee device 130, such as approximately 3 feet, 1 foot, 6 inches, or other small area where only user device 110 may connect with wireless beacon 136 (e.g., an average distance between user 102 and a store employee operating employee device 130. Thus, check-in application 112 may connect with wireless beacon 136 when user 102 is nearby wireless beacon 136 with user device 110.

Check-in application 112 may execute in the background of an operating system of user device 110 and be configured to establish the connections, using communication module 118 of user device 110, with wireless beacon 136. The connection may be established with or without user input from user 102. For example, wireless beacon 136 may broadcast a token, such as a universally unique identifier (UUID), for reception by check-in application 112, as will be explained in more detail herein. Check-in application 112 may utilize communication module 118 of user device 110 to receive the token from wireless beacon 136. If check-in application 112 acknowledges the UUID as identifying wireless beacon 136, merchant device 140, and/or payment provider server 160 (e.g., if check-in application 112 determines the UUID corresponds to a request to complete a check-in), check-in application 112 may transmit an identifier (or other identification information) corresponding to user 102 and/or user device 110 back to the wireless beacon 136. Check-in application 112 may utilize communication module 118 of user device 110 to communicate with wireless beacon 136 (e.g., over near field communication, Bluetooth, Bluetooth Low Energy, radio, infrared, LTE Direct, or other connection). The identifier from user device 110 may include, be transmitted with, concatenated with, or otherwise bundled with the identifier received from the wireless beacon 136. In other embodiments, different information may be transmitted to wireless beacon 136, such as a name or other personal information for user 102, a loyalty account for user 102 with the merchant, payment information for user 102, etc. Thus, the information transmitted to wireless beacon 136 does not need to be utilized to process and/or complete a check-in with merchant device 140 when information for user 102 has already be received from a previous check-in.

Once a connection is established with wireless beacon 136, user device 110 may be checked-in with merchant device 140 if user 102 has not previously been checked-in. Once connected to wireless beacon 136, the identifier or other identification information for user 102 may be associated with a transaction. For example, an employee for the merchant location may use employee device 130 to scan one or more items/services for purchase by user 102 into a transaction, as will be explained in more detail herein. Once the transaction is established and generated, the identifier may be used to identify the transaction associated with user 102. User 102 may then instruct the employee to suspend the transaction verbally or may utilize payment application 120 to suspend the transaction, such as through an instruction to employee device 130. Once the transaction is suspended, user 102 may later recall the transaction using a transaction code provided to user 102 or through a connection between user device 110 and another wireless beacon at, nearby, or connected to merchant device 140. The transaction code may be provided to user 102 through payment application 120 from employee device 130, may be a physical token, chip, or other item containing the transaction code, or may be verbally given to user 102. In embodiments, where the transaction is resumed using a new connection between user device 110 and a wireless beacon corresponding to merchant device 140, check-in application 120 may connect to the wireless beacon as described above.

Payment application 120 may be used, for example, to provide a convenient interface to permit user 102 to select payment options and provide payment for items and/or services. For example, payment application 120 may be implemented as an application having a user interface enabling the user to enter payment options for storage by user device 110, provide payment to a merchant (e.g., through merchant device 140), and complete a transaction for the items and/or services using a payment instrument (e.g., a payment account with payment provider server 160).

In certain embodiments, payment application 120 may correspond more generally to a web browser configured to view information available over the Internet or access a website corresponding to a payment provider.

Payment application 120 may receive a transaction code used to resume a suspended transaction from employee device 130. The transaction code may later be transmitted to merchant device 140 to resume the transaction. Thus, payment application 120 may transmit the transaction code to merchant device 140. Once the transaction is resumed, user 102 may add additional items/services to the transaction (e.g., by scanning one or more additional items/service into the transaction) and/or the transaction may be processed with a payment and completed. Payment application 120 may also provide stored incentives (e.g., loyalty account benefits, discounts, coupons, etc.) to merchant device 140 for use with the suspended transaction. The incentives may be provided when the transaction is suspended and/or when a payment for a transaction is being processed.

Payment application 120 may be configured to provide payment to merchant device 140. In this regard, payment application 120 may correspond to an application that may provide an interface where user 102 may view a transaction for one or more items scanned by employee device 130. Additionally, user 102 may generate a payment request for the transaction to merchant device 140. The payment request may provide a payment instrument, such as a credit/debit card, checking account, payment account, etc. Where a payment account is utilized, payment application 120 may instruct payment provider server 160 to provide payment for the transaction to the merchant. The payment request may correspond to a token including the selected payment instrument for user 102. The payment instrument may include an account identifier, payment card, bank account, etc. Once the payment request is generated, user 102 may authorize the payment request for transmission to merchant device 140 and/or payment provider server 160 in order to effectuate a payment to the merchant. Payment application 120 may transmit the payment request to payment provider server 160 with an identifier for the merchant in order to complete the payment to the merchant. In other embodiments, payment application 120 may transmit the payment request as a token with a payment instrument and identifier for user 102 to merchant device 140 for completion by the merchant.

In various embodiments, one or more features of check-in application 112 and/or payment application 120 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 160. Other applications 114 may include browser, social networking, and/or mapping applications. Various applications, features, and/or processes of other applications 114 may be used in conjunction with check-in application 112 and/or payment application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, payment application 120, and/or other applications 114, identifiers associated with hardware of user device 110, or other appropriate identifiers, such as identifiers used for payment/user/device authentication or identification. Identifiers in database 116 may be used by a payment/credit provider, such as payment provider server 160, to associate user device 110 with a particular account maintained by the payment/credit provider. Database 116 may include user device tokens and/or encryption keys, including an encryption key of wireless beacon 136, merchant device 140, and/or payment provider server 160. Database 116 may include identifying information for tokens enabling check-in application 112 to identify employee device 130, wireless beacon 136, merchant device 140, and/or payment provider server 160 when receiving a corresponding check-in token. In various embodiments, database 116 may store information used to identify a suspended transaction, such as a transaction code or other identifier enabling identification of the suspended transaction.

User device 110 includes at least one communication module 118 adapted to communicate with employee device 130, wireless beacon 136, merchant device 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 136 using short range communications, such as Bluetooth Low Energy, LTE Direct, radio frequency, infrared, Bluetooth, and near field communications.

Employee device 130 may be implemented using any appropriate hardware and software configured for wired and/or wireless communication with user device 110, merchant device 140, and/or payment provider server 160. For example, in one embodiment, employee device 130 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a device is shown, the device may be managed or controlled by any suitable processing device. Although only one employee device is shown, a plurality of employee devices may function similarly.

Employee device 130 of FIG. 1 contains a scanning application 132, scanner 134, wireless beacon 136, and a communication module 138. Scanning application 132 may correspond to processes, procedures, and/or applications, for example, a software program, executable by a hardware processor. In other embodiments, employee device 130 may include additional or different software as required.

Scanning application 132 may correspond to an application having features and processes that interface with scanner 134 to enable a merchant employee correspond to employee device 130 to enter information for one or more items and/or services selected by user 102 for purchase to employee device 130 and generate a transaction. In this regard, the merchant employee may utilize employee device 130 to input the information, such as through scanner 134 and scanning/reading a barcode, QR code, or other readable information for the item/service (e.g., on a box, display panel, etc., for the item/service). In other embodiments, other input processes may be utilized to input information for the selected item(s)/service(s) to scanning application 132.

Once the item(s)/service(s) for purchase by user 102 are entered by scanning application 132 using, in various embodiments, scanner 134, a transaction for the item(s)/service(s) may be determined and generated. The transaction may include transaction information having a name or identifier of the selected item(s)/service(s), a total cost and/or cost of each item/service, incentives applied to the transaction, payment information for user 102 to use for the transaction, and/or other information used to complete the transaction. Employee device 130 may receive and/or access check-in information, an identifier, and/or other identification information for user 102. Such identification information may be received from user device 110 based on a connection between user device 110 and a wireless beacon (e.g., wireless beacon 136), as previously discussed. Scanning application 132 may associate the transaction with identification for user 102, such as the identifier, personal and/or payment information, or other information received from user 102. Once the transaction and the identification are associated, user 102 may choose to complete the transaction by providing payment for the transaction, in various embodiments, using payment provider server 160.

In other embodiments, user 102 may wish to suspend the transaction and later resume the transaction, for example, if services are required to be rendered to user 102, if an employee at the merchant location is required to retrieve the item(s) in the transaction for user 102, if user 102 wishes to continue shopping, or other circumstance. In such examples, user 102 may choose to suspend the transaction with employee device 130 so that the transaction can later be resumed and processed with merchant device 140. User 102 may inform the merchant employee to suspend the transaction using scanning application 132. When the transaction is suspended, the transaction and the identifier or other identification information for user 102 may be stored by employee device 130 and/or transmitted to merchant device 140 for storage.

While the transaction is suspended, no additional processing for the transaction (e.g., a payment) may be performed. User 102 may be given a transaction code to recall the transaction later. The transaction code may be displayed to the merchant employee and/or user 102 on employee device 130. In other embodiments, user 102 may receive a print out, token, RFID tag, or other physical possession that may store or display the transaction code. In other embodiments, the transaction may be stored with the identifier for user 102 and/or user device 110 that was transmitted to wireless beacon 136. In such embodiments, the transaction may later be recalled when user device 110 connects to another wireless beacon corresponding to merchant device 140 and transmits the identifier to the wireless beacon. Thus, merchant device 140 may retrieve the transaction using the identifier for user 102/user device 110 when user device 110 is in proximity to merchant device 140.

User 102 may update the transaction prior to processing and completing a payment for the transaction. For example, user 102 may have one or more items/services added to the transaction, removed from the transaction, or updated in the transaction (e.g., with incentives or discounts for the selected item(s)/service(s)). User 102 may utilize the transaction code to resume and update the transaction with employee device 130 or another employee device. In other embodiments, user 102 may update the transaction on user device 110 using the transaction code to recall and resume the transaction. Once the transaction is updated, a new transaction code may be generated or the previous transaction code may be further used. Once user 102 is ready to complete the transaction by providing payment for the transaction, user 102 may resume the transaction with merchant device 140 using the transaction code or through a connection to a wireless beacon corresponding to merchant device 140, as will be explained in more detail herein.

Scanner 134 may correspond to a device and associated software (e.g., scanning application 132) utilized to input items and/or services for a transaction. Scanner 134 may include hardware utilized to capture information for item(s)/service(s) selected by user 102 for purchase. In this regard, scanner 134 may correspond to an optical device (e.g., infrared scanner, camera, etc.) that may capture an alphanumeric code, bar code, QR code, text, or other data for an item or service and determine the item/service for entry into a transaction. Scanner 134 may determine the item/service through a database of employee device 140 and/or a remote database, such as a database 146 of merchant device 140. Once scanner 134 has received the item/service information, scanning application 132 may add the item/service to a transaction, as previously discussed.

Wireless beacon 136 may correspond to a device used with employee device 130 to connect to user device 110, establish check-in information, and/or enable employee device 130 to associate an identifier for user 102/user device 110 with a transaction. Wireless beacon 136 may be implemented using any appropriate hardware and software configured for wireless communication with user device 110. For example, in one embodiment, wireless beacon 136 may be implemented as a dongle device including a hardware processor and a communication module, for example, connected to employee device 130. Wireless beacon 136 may also be implemented as devices incorporated within employee device 130. Additionally, a wireless beacon, such as one initially establishing check-in information at the merchant location and/or one corresponding to merchant device 140 for use in resuming a transaction, may also act as a stand-alone device including a processor, communication module, and/or network interface component configured to communicate with user device 110, employee device 130, merchant device 140, and/or payment provider server 160. Although wireless beacon 136 is described singly with respect to employee device 130, a plurality of wireless beacons may established at the merchant location, as previously discussed, and/or each associated with a plurality of employee devices.

Wireless beacon 136 of FIG. 1 contains processes, procedures, and/or applications, for example, a software program, executable by a hardware processor configured to interact with user device 110, employee device 130, and/or merchant device 140. Thus, regardless of the implementation of wireless beacon 136 as discussed above, wireless beacon 136 may utilize a connection/check-in process and include or be connected to a communication module. In other embodiments, wireless beacon 136 may include additional or different hardware and software as required.

Wireless beacon 136 may include and/or execute an application for transmitting requests to establish a connection between a device (e.g., user device 110) and wireless beacon 136. The requests may be unique to wireless beacon 136, thereby identifying wireless beacon 136. Wireless beacon 136 may utilize short range wireless communications of wireless beacon 136 to transmit the requests to establish a connection, including an identifier such as a Universally Unique Identifier (UUID). If user device 110 receives a request to establish the connection with wireless beacon 136 and responds with an identifier for user 102/user device 110 (potentially including the UUID and other information necessary to effectuate a check-in for user 102, as previously discussed), wireless beacon 136 to ramp up in power and create a connection between user device 110 and wireless beacon 136.

Wireless beacon 136 may transmit the request to establish the connection as a short range wireless communication (e.g. a BLE protocol communication) including a "wake up" process for check-in application 112 of user device 110 and/or a token for wireless beacon 136. In other embodiments, the request and/or connection may utilize near field communication, radio communication, infrared communication, or Bluetooth communication. Additionally, although wireless beacon 136 may utilize BLE protocol communications to effectuate an "always on" type service where the UUID and "wake up" process are transmitted continuously or at some interval, other communication protocols used to provide an "always on" service may include QUAL-COMM® LTE Direct or similar device-to-device communication technology. BLE and LTE Direct may both be utilized to provide discovery of nearby devices to wireless beacon 136 (e.g., user device 110) and establishment of a connection for data transfers. In other embodiments, wireless beacon 136 may correspond to other devices, such as WiFi capable devices, near field communication devices, etc.

The request may be specific to user device 110 by including information that is specific to user 102 and/or user device 110, such as a name, identifier, or user device identifier. The information specific to user 102 may be determined from a user account of user 102 or other information previously provided to employee device 130 and/or merchant device 140 (e.g., a previous check-in, a loyalty account, etc.). Thus, in certain embodiments, only user device 110 will pick up and authenticate the request, for example, if user 102 has previously performed a check-in with the merchant device 140. After wireless beacon 136 receives an identifier from user device 110, wireless beacon 136 may determine user 102 is in proximity to wireless beacon 136. Wireless beacon 136 may pass the identifier (and any other device's identifiers where applicable) to employee device 130 and/or merchant device 140 to associate user 102 with wireless beacon 136.

Wireless beacon 136 may utilize a communication module within wireless beacon 136 and/or communication module 138 to pass the check-in information and/or identifier for user 102/user device 110 to merchant device 140. Thus, wireless beacon 136 and/or employee device 130 includes communication module 138 adapted to communicate with user device 110 and/or merchant device 140. Communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may also communicate with user device 110 and/or merchant device 140 using short range communications, such as Bluetooth Low Energy, LTE Direct, WiFi, radio frequency, infrared, Bluetooth, and near field communications.

Merchant device 140 may be implemented using any appropriate hardware and software configured for wired and/or wireless communication with user device 110, employee device 130, wireless beacon 136, and/or payment provider server 160. Merchant device 140 may correspond to a device utilized to complete a check-in for user 102 at a merchant location corresponding to merchant device 140. Merchant device 140 may further be used to resume a suspended transaction and process and payment for the transaction. Thus, merchant device 140 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 140 may be included in payment provider server 160, and vice versa.

Merchant device 140 of FIG. 1 contains a check-in application 142, a sales application 150, other applications 144, a database 146, and a communication module 148. Check-in application 142, sales application 150 and other applications 144 may correspond to processes, procedures, and/or applications, for example, a software program, executable by a hardware processor. In other embodiments, merchant device 140 may include additional or different software as required.

Check-in application 142 may correspond to processes to complete a check-in with user device 110 for a merchant location corresponding to merchant device 140 (e.g., a merchant storefront, an event venue, a transportation provider location including airports and train stations, or another service provider location). Thus, check-in application 142 may correspond to the merchant device side application configured to receive check-in information (e.g., user account information, an identifier for user 102/user device 110, user payment and/or person information, or other identification information for user 102/user device 110) from user device 110 and complete the check-in. The check-in request may include log in information for a user account with merchant device 140 and/or payment provider server 160 and thus complete the check-in with user 102 by verifying the account information. For example, the check-in information may include an identifier or other account information for a user/payment account of user 102. However, in embodiments where a user account has not been previously established by user 102, check-in application 142 may receive other information identifying user 102, including a user name/identifier, user device identifier, an identifier for an account with another entity, or other information.

As previously discussed, check-in application 142 may perform a check-in for user 102 by receiving identification information for user 102 over network 170, from a wireless beacon established at the merchant location, and/or from employee device 130 when user device 110 connects to wireless beacon 136. Once check-in is completed between user device 110 and merchant device 140, check-in application 142 may be utilized to transmit and receive information corresponding to user 102. Such information may include payment information, transaction codes, and/or identifiers used to resume a suspended transaction. In various embodiments, once user 102 wishes to resume a transaction that has been suspended, check-in application 142 may receive the request to resume the transaction and request the transaction be loaded to sales application 150 from employee device 130 and/or database 146.

Sales application 150 may be used, for example, to provide a convenient interface to permit a merchant, salesperson, and/or other employee utilizing merchant device 140 to enter, view, and/or process items/services user 102 wishes to purchase. For example, sales application 150 may be implemented as an application having a user interface enabling the user of merchant device 140 to enter the items/services user 102 has selected for purchase (e.g., through input by the user and/or user 102, scanning the items/services, loading a suspended transaction of scanned items/services, etc.). Sales application 150 may further enable the merchant to view the items/services for purchase by user 102 in a transaction, enter coupons and/or discounts for the transaction, edit the transaction including adding, removing, and/or modifying items/services, or other functions with regard to the selected transaction. Once the items/services have been arranged into a transaction, a total may be calculated and the transaction may be engaged with user 102 to complete payment for the selected items/services.

As previously discussed, a transaction may be loaded to sales application 150 using a transaction code supplied by user 102 and/or user device 110. The transaction code may recall a transaction that has been suspended and stored to database 146, for example, when employee device 130 generates the transaction and user 102 chooses to suspend the transaction. The transaction may also be recalled when user device 110 connects to a wireless beacon at, nearby, and/or connected to merchant device 140. Thus, merchant device 110 may receive a request to resume a transaction when user 102 and/or user device 110 provides a transaction code to resume the transaction and/or when user device 110 is within a proximity to merchant device 140 and may connect to merchant device 140 and/or a wireless beacon corresponding to merchant device 140. Once the transaction is resumed, it may be processed and completed by receiving a payment instrument to complete a payment for the transaction and processing a payment using the payment instrument.

Sales application 150 may request payment covering the transaction from user 102. Sales application 150 may receive a payment instrument from user 102 to complete the transaction for the selected items/services. The payment instrument may correspond to cash, payment cards, checks, and/or payment accounts with payment provider server 160, in various embodiments. Once a transaction is processed and/or completed by sales application 150 for the transaction, a transaction history (e.g., receipt) may be generated and provided to one or more of user 102, user device 110, and/or payment provider server 160. The transaction history may be stored to database 146 and/or provided to user 102, such as through a printout and/or electronic documentation with user device 110.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 170, or other types of applications. In various embodiments, other applications 144 may include financial applications, such as banking, online payments, money transfer, or other applications associated with payment provider server 160. Other applications 144 may contain other software programs, executable by a processor, including a graphical user interface (GUI) configured to provide an interface to the user.

Merchant device 140 may further include database 146 which may include, for example, identifiers such as operating system registry entries, cookies associated with check-in application 142, sales application 150, and/or other applications 144, identifiers associated with hardware of merchant device 140, or other appropriate identifiers, such as identifiers used for payment/user/device authentication or identification. In one embodiment, identifiers in database 146 may be used by payment provider server 160 to associate merchant device 140 with a particular account maintained by payment provider server 160. Database 146 may also store user 102's information, including check-in information, an identifier, or other identification information for user 102 received from a check-in by user 102 and/or a connection between user device 110 and a wireless beacon (e.g., wireless beacon 136). Database 146 may include suspended transactions for user 102 with the identification information.

Merchant device 140 includes at least one communication module 148 adapted to communicate with user device 110, employee device 130, wireless beacon 136, and/or payment provider server 160. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 136 using short range communications, such as Bluetooth Low Energy, LTE Direct, radio frequency, infrared, Bluetooth, and near field communications.

Payment provider server 160 may be maintained, for example, by an online payment service provider, which may provide payment services and/or processing for financial transactions on behalf of a user. In this regard, payment provider server 160 includes one or more processing applications which may be configured to interact with user device 110 and/or merchant device 140 to facilitate payment for a transaction. In one example, payment provider server 160 may be provided by PAYPAL®, Inc. of San Jose, Calif., USA. However, in other embodiments, payment provider server 160 may be maintained by or include a credit provider, financial services provider, financial data provider, and/or other service provider, which may provide payment services to user 102 and/or the merchant. Moreover, in various embodiments, one or more of the applications, processes, and/or features discussed below in reference to payment provider server 160 may be included in merchant device 140, and vice versa.

Payment provider server 160 of FIG. 1 includes a transaction processing application 162, other applications 164, a database 166, and a network interface component 168. Transaction processing application 162 and other applications 164 may correspond to processes, procedures, and/or applications, for example, a software program, executable by a hardware processor. In other embodiments, payment provider server 160 may include additional or different software as required, such as a check-in application as discussed in reference to merchant device 140, where those features are instead provided by payment provider server 160.

Transaction processing application 162 may be configured to receive information from and/or transmit information to user device 110 and/or merchant device 140 for processing and completion of financial transactions. Transaction processing application 162 may include one or more applications to process financial transaction information from user 102 and merchant for merchant device 140 by receiving a request to complete transaction for items and/or services offered by the merchant. The request may correspond to a payment from user 102 to the merchant. The payment may include a user account identifier or other payment information (e.g. a credit/debit card or checking account) for user 102 and a receiving account for the merchant. Additionally, the payment may include a payment amount and terms of payment. Transaction processing application 162 may complete the transaction by providing payment to the merchant through the receiving account/payment information. Additionally, transaction processing application 162 may provide transaction histories, including receipts, to user device 110 and/or merchant device 140 for completion and documentation of the financial transaction. For example, a transaction history may be provided to user device 110 and/or merchant device 140 to allow for the merchant to view the transaction and provide the items and/or services to user 102.

In various embodiments, payment provider server 160 includes other applications 164 as may be desired in particular embodiments to provide features to payment provider server 160. For example, other applications 164 may include security applications for implementing server-side security features, programmatic server applications for interfacing with appropriate application programming interfaces (APIs) over network 170, or other types of applications. Other applications 164 may contain software programs, executable by a processor, including a graphical user interface (GUI), configured to provide an interface to a user.

Additionally, payment provider server 160 includes database 166. As previously discussed, user 102 and/or the merchant may establish one or more payment accounts with payment provider server 160. User accounts in database 166 may include merchant/user information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 160, e.g. from user device 110 and/or merchant device 140, a payment account belonging to user 102 and/or the merchant may be found. In other embodiments, user 102 and/or the merchant may not have previously established a payment account and may provide other financial information to payment provider server 160 to complete financial transactions, as previously discussed.

In various embodiments, payment provider server 160 includes at least one network interface component 168 adapted to communicate user device 110 and/or merchant device 140 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
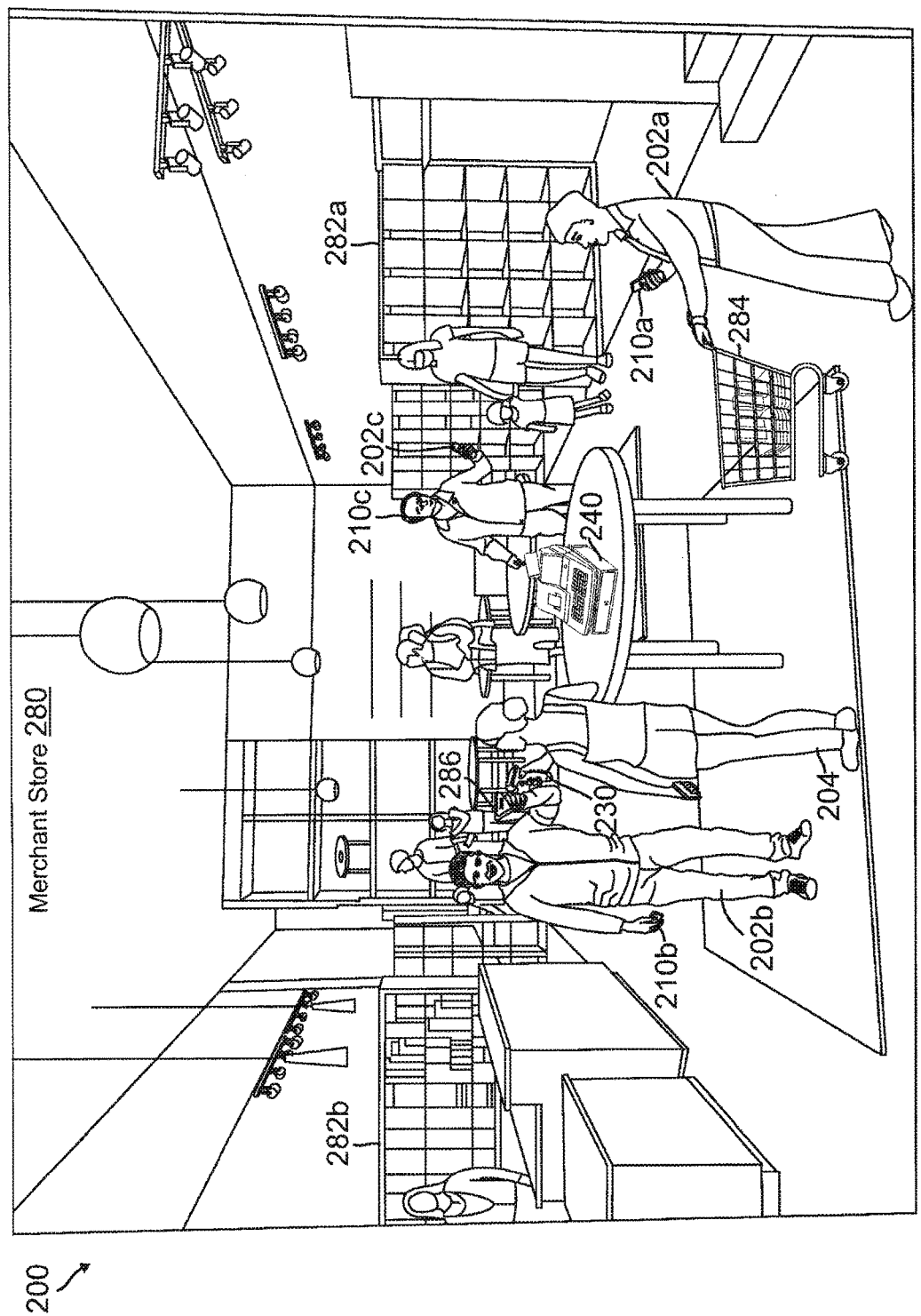
FIG. 2 is an exemplary merchant location environment with users selecting items for purchase and suspending transactions for the items until arrival at a checkout line, according to an embodiment.

FIG. 2 is an exemplary merchant location environment with users selecting items for purchase and suspending transactions for the items until arrival at a checkout line, according to an embodiment. Environment 200 of FIG. 2 includes a user 202a utilizing a user device 210a, a user 202b utilizing a user device 210b, and a user 202c utilizing a user device 210c all corresponding generally to user 102 utilizing user device 110, respectively, of FIG. 1. Moreover, environment 200 includes an employee device 230 and a merchant device 240 corresponding generally to wireless beacon 136 of FIG. 1.

FIG. 2 shows a merchant store 280 corresponding to a merchant storefront, retail location, or other physical place where users 202a-202c may shop for items/services, select one or more item/service for purchase, and engage in a transaction for the selected item(s)/service(s). Merchant store 280 includes a shelf 282a and a shelf 282b where the merchant corresponding to merchant store 280 may place items for sale to users 202a-202c. Users 202a-202c may previously have established a check-in with merchant store 280. User 202a may place items into a cart 284 while browsing shelf 282a. When placing items into cart 284, user 202a may scan, the items in using a scanner with user device 210a (e.g., a camera and/or mobile phone application) that enters the information for the selected items to a transaction. Alternatively, cart 284 may be equipped with a scanner, such as an infrared scanner, that may enter in the items to a transaction. In other embodiments, user 202a may be required to visit with a merchant employee 204 in order to scan the selected items in cart 284 into a transaction. Once items are entered to a transaction, the transaction may be suspended by user 202a until user 202a has received the items, completed shopping, and wishes to pay for the transaction. The previous check-in through user device 210a may supply an identifier for use with suspending the transaction.

If merchant store 280 does not allow for self-scanning/entering of items to a transaction, user 202b may request that merchant employee 204 enter an item 286 that user 202b has selected from shelf 282b into a transaction. Thus, user 202b may present item 286 to merchant employee 204. Merchant employee 204 may utilize employee device 230 to scan in item 286 into a transaction. User device 210b may have previously established a check-in with merchant store 280 to supply an identifier used with the transaction. Thus, employee device 230 may include a wireless beacon that connects with user device 210b and recalls the identifier. In other embodiments, the identifier may be supplied when user device 210b and employee device 230 connect. Once the identifier is supplied to employee device 230, the identifier may be stored with the transaction and user 202b may request the transaction for item 286 be suspended. As previously discussed, in some embodiments, merchant employee 204 may provide user 202b with a transaction code when suspending the transaction.

Once a user is ready to resume the transaction, such as if the user wishes to process a payment for the transaction, the user may approach merchant device 240 to process the transaction. Thus, user 202c arrives at merchant device 240 with user device 210c in order to resume and complete the transaction. User 202c and/or user device 210c may supply a transaction code to merchant device 240 in order to recall the transaction. However, in other embodiments, merchant device 240 may include a wireless beacon within, nearby, and/or connected to merchant device 240 that connects with user device 210c. Thus, once user device 210c and the wireless beacon connect, merchant device 240 may be supplied with the identifier for the transaction, and the transaction may be recalled and resumed. Once the transaction is retrieved, user 202c may engage in a payment for the transaction.

Figure 3:
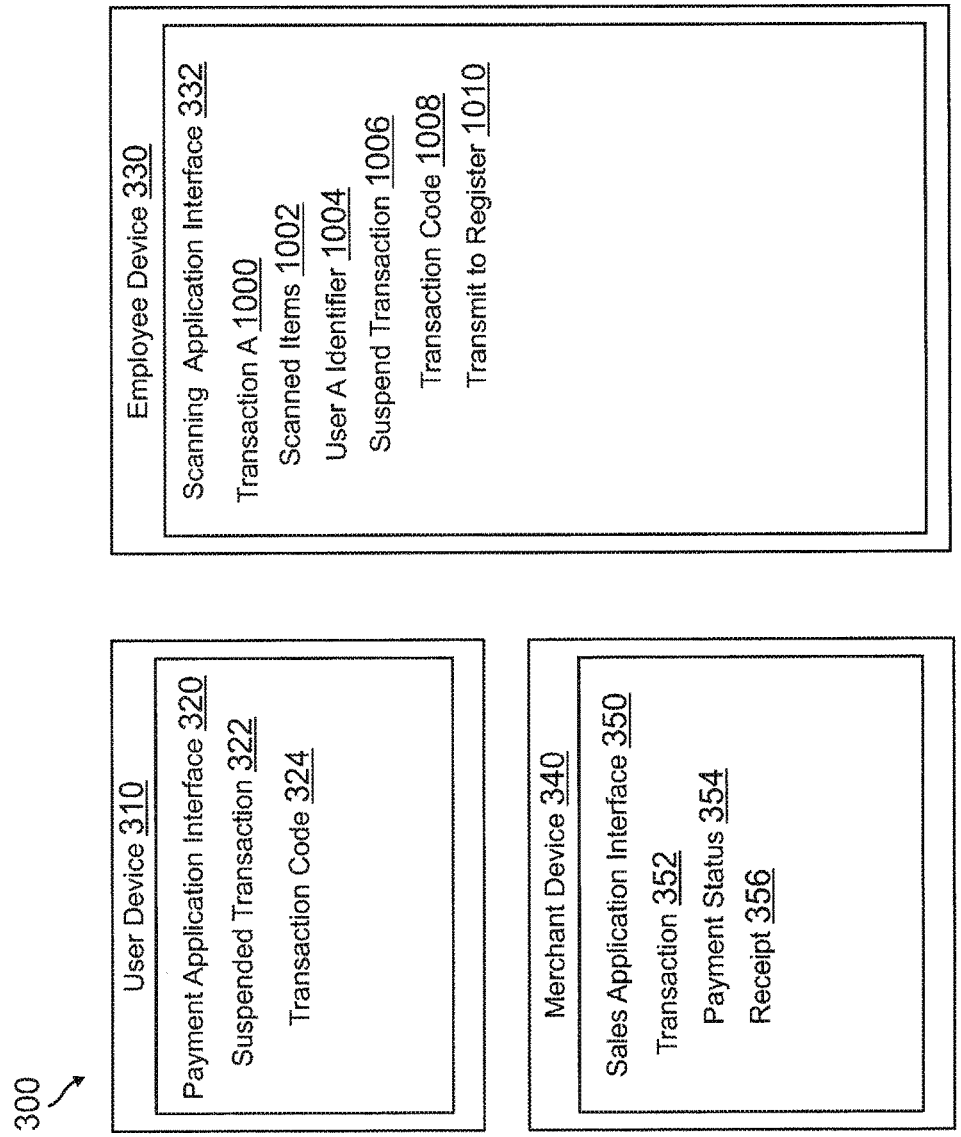
FIG. 3 is an exemplary system environment showing display screens of a user device, an employee device, and a merchant device when suspending and resuming a transaction, according to an embodiment.

FIG. 3 is an exemplary system environment showing display screens of a user device, an employee device, and a merchant device when suspending and resuming a transaction, according to an embodiment. Environment 300 includes a user device 310, an employee device 330, and a merchant device 340 corresponding generally to user device 110, employee device 130, and merchant device 140, respectively, of FIG. 1.

Employee device 330 displays a scanning application interface 332 corresponding generally to the processes and features described in reference to scanning application 132 of FIG. 1. As previously discussed, employee device 330 may be utilized to generate a transaction from one or more items/services entered/scanned by employee device 330. In this regard, scanning application interface 332 includes a transaction A 1000 having scanned items 1002, a user A identifier 1004, and a suspend transaction 1006 process. Scanned items 1002 may include a list of the item(s)/service(s) in a transaction, and may include information about the item(s)/service(s), such as price, availability, stock room location, description, etc. Scanned items 1002 may be populated after entering the item(s)/service(s) into employee device 330 by a merchant employee. Transaction A 1000 further includes user A identifier 1004, which may correspond to an identifier or other identification information for the user of user device 310 that wishes to purchase scanned items 1002. The merchant employee corresponding to employee device 330 may further select to suspend transaction A 1000 using suspend transaction 1006 process. If the merchant employee suspends the transaction, the merchant employee may view transaction code 1008, which may be provided to the user of user device 310. The merchant employee may further transmit the suspended transaction A 1000 to merchant device 340 for resuming later by selecting a transmit to register 1010 process.

User device 310 displays a payment application interface 320 corresponding generally to the processes and features described in reference to payment application 120 of FIG. 1. Payment application interface 320 includes a suspended transaction 322 and a transaction code 324. As previously discussed, the user of user device 310 may have suspended transaction A 1000. Thus, suspended transaction 322 may appear to the user in payment application interface 320 so that the user may view the transaction and choose to resume and edit or pay as necessary. In order to recall the transaction with merchant device 340, the user may view transaction code 324, which may include the code from transaction code 1008 and further include a process to transmit the transaction code to merchant device 340.

Merchant device 340 displays a sales application interface 350 corresponding generally to the processes and features described in reference to sales application 150 of FIG. 1. Sales application interface 350 may be utilized to process a payment for the transaction. Sales application interface 350 may load the transaction for payment after the user of user device 310 requests to resume the transaction. Thus, once the user requests to resume the transaction, sales application interface 350 includes a transaction 352 having a payment status 354 and a receipt 356. Transaction 352 may display the selected item(s)/service(s) for purchase by the user, such as scanned items 1002. Once the user is ready to pay, payment status 354 may display whether the payment for transaction 352 has been processed, is pending, or has been rejected. Further, receipt 356 may be utilized to provide a transaction history and documentation of payment for transaction 352.

Figure 4:
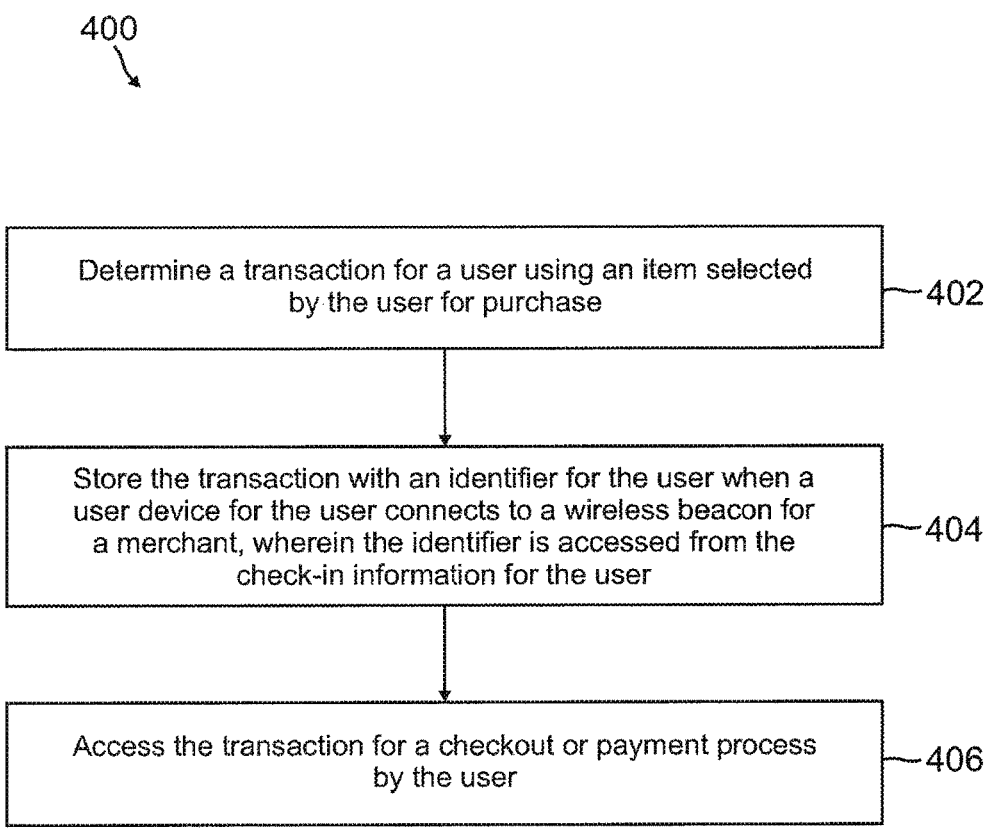
FIG. 4 is a flowchart of an exemplary process for suspending and resuming transactions through wireless beacon communications, according to an embodiment.

FIG. 4 is a flowchart of an exemplary process for suspending and resuming transactions through wireless beacon communications, according to an embodiment. Note that one or more steps, processes, and methods described herein may be omitted, performed in a different sequence, or combined as desired or appropriate.

At step 402, a transaction for a user is determined using an item selected by the user for purchase. The transaction may be determined by scanning at least one item or service using a barcode scanner or a QR code scanner. An employee at a merchant location may perform the scanning of the item using an employee device that includes a wireless beacon connected to the employee device. In other embodiments, the item may be scanned by the user when the user places the item in a holding basket, wherein the holding basket includes a wireless beacon. Thus, at step 404, the transaction is stored with an identifier for the user when a user device for the user connects to a wireless beacon for a merchant, wherein the identifier is accessed from check-in information for the user. The user device and the wireless beacon may connect using one of near field communication, radio communication, infrared communication, Bluetooth communication, Bluetooth Low Energy (BLE) communication, LTE Direct communication, and WiFi communication.

The check-in information may be received using a connection between the user device and another wireless beacon, wherein the first wireless beacon is connected to an employee device for an employee at the merchant location, and wherein the second wireless beacon is located at the merchant location, such as near a merchant payment device, POS device, and/or checkout device. For example, the second wireless beacon may be further located near a checkout line. The check-in information may also be received after the user completes a check-in for the merchant location over a network connection.

The transaction is accessed for a checkout or payment process by the user, at step 406. The transaction may be accessed by a merchant point of sale or checkout device using a transaction code, where the transaction code is previously generated that identifies the transaction and is communicated to the user. The transaction code may be communicated to the user device, wherein the user device communicates the transaction code to a point of sale or checkout device during the checkout/payment process. In various embodiments, prior to payment, another item or service may be added to the transaction, which may be updated. Additionally, incentives for the user may be accessed and processed with the transaction during payment. Thus, a payment for the transaction may be processed, for example, using a payment account with a payment provider.

Figure 5:
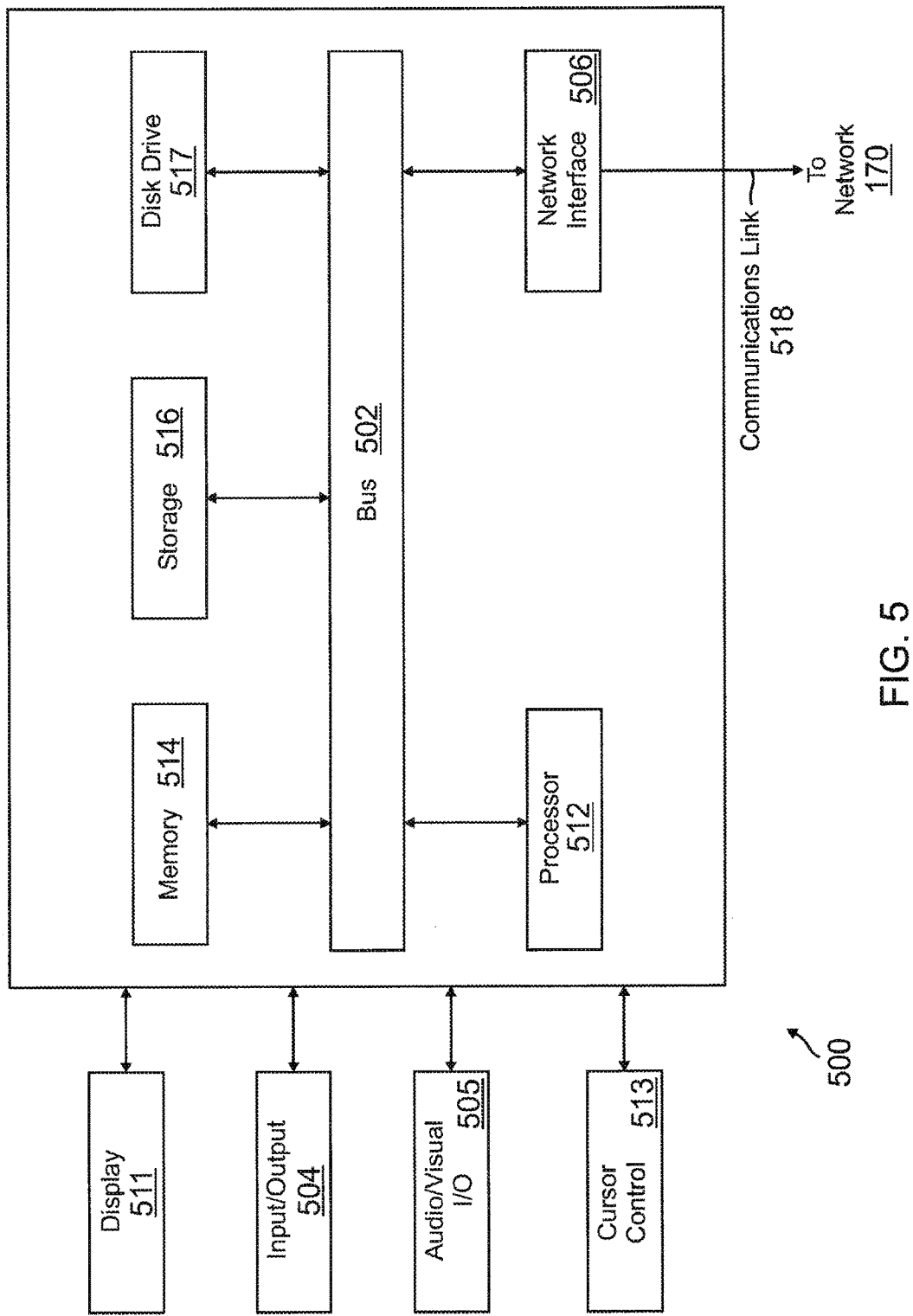
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions;
a processor configured to execute the instructions to cause the system to:
in response to a check-in communication with a user device, retrieve a user information associated with the user device;
determine transaction information for a transaction between a user and a merchant, the transaction information including at least one item selected for purchase by the user of the user device;
receive a request to suspend the transaction from the user device;
generate and transmit, in respond to the request, a transactional code associated with the transaction information of the user device;
determine that the user is at a checkout location within a merchant location; and
retrieve the transaction information for the checkout process to purchase the at least one item selected for purchase using the transactional code and the user information associated with the user device.

2. The system of claim 1, executing the instructions further causes the system to:

in response to detecting a user device in proximity to the merchant location, transmit the check-in communication to the user device.

3. The system of claim 1, executing the instructions further causes the system to:
determine the transaction information is edited; and
update a purchase amount based on the edited transaction information.

4. The system of claim 3, wherein the edited transaction information includes removing the at least one item selected for purchase by the user.

5. The system of claim 1, executing the instructions further causes the system to:
determine another item is selected for purchase; and
generate, another transaction code associated with the transaction information and the another item selected for purchase.

6. The system of claim 1, wherein the transaction information includes incentives available from the merchant to the user.

7. The system of claim 1, executing the instructions further causes the system to:
receive, product information corresponding to products selected for purchase by the user, the product information obtained using a merchant device located in a holding basket.

8. A method comprising:
in response to a check-in communication with a user device, retrieving a user information associated with the user device;
determining transaction information for a transaction between a user and a merchant, the transaction information including at least one item selected for purchase by the user of the user device;
receiving a request to suspend the transaction from the user device;
generating and transmit, in response to the request, a transaction code associated with the transaction information to the user device;
determining that the user is at a checkout location within a merchant location, the determination based in part on a receipt of the transaction code; and
retrieving the transaction information for a checkout process to purchase the at least one item selected for purchase using the user information associated with the user device.

9. The method of claim 8, further comprising:
in response to detecting a user device in proximity to the merchant location, transmitting the check-in communication to the user device.

10. The method of claim 8, further comprising:
determining the transaction information is edited; and
updating a purchase amount based on the edited transaction information.

11. The method of claim 10, wherein the edited transaction information includes removing the at least one item selected for purchase by the user.

12. The method of claim 8, further comprising:
determining another item is selected for purchase; and
generating, another transaction code associated with the transaction information and the another item selected for purchase.

13. The method of claim 8, wherein the transaction information includes incentives available from the merchant to the user.

14. The method of claim 8, further comprising:
receiving, a product information corresponding to products selected for purchase by the user, the product information obtained using a merchant device located in a holding basket.

15. A non-transitory machine-readable medium having instructions stored thereon, to cause performance of operations comprising:
in response to a check-in communication with a user device, retrieving a user information associated with the user device;
determining transaction information for a transaction between a user and a merchant, the transaction information including at least one item selected for purchase by the user of the user device;
receiving a request to suspend the transaction from the user device;
generating and transmit, in response to the request, a transaction code associated with the transaction information to the user device;
determining that the user is at a checkout location within a merchant location, the determination based in part on a receipt of the transaction code; and
retrieving the transaction information for a checkout process to purchase the at least one item selected for purchase using the user information associated with the user device.

16. The non-transitory machine-readable medium of claim 15, further comprising:
in response to detecting a user device in proximity to the merchant location, transmitting the check-in communication to the user device.

17. The non-transitory machine-readable medium of claim 15, further comprising:
determining the transaction information is edited; and
updating a purchase amount based on the edited transaction information.

18. The non-transitory machine-readable medium of claim 17, wherein the edited transaction information includes removing the at least one item selected for purchase by the user.

19. The non-transitory machine-readable medium of claim 15, further comprising:
determining another item is selected for purchase; and
generating, another transaction code associated with the transaction information and the another item selected for purchase.

20. The non-transitory machine-readable medium of claim 15, wherein the transaction information includes incentives available from the merchant to the user.

* * * * *